United States Patent [19]

Soros

[11] 4,350,467

[45] Sep. 21, 1982

[54] SELF-UNLOADING CARGO VESSEL

[76] Inventor: Paul Soros, 1102 Oenoke Ridge, New Canaan, Conn. 06840

[21] Appl. No.: 171,008

[22] Filed: Jul. 18, 1980

[51] Int. Cl.³ .................. B65G 67/58; B23B 35/30
[52] U.S. Cl. .................................. 414/144; 414/133; 414/308; 414/313
[58] Field of Search ............... 414/133, 139, 140, 143, 414/144, 145, 305, 308, 313; 198/516, 520, 519

[56] References Cited

U.S. PATENT DOCUMENTS

| | | | |
|---|---|---|---|
| 775,081 | 11/1904 | Hoover et al. | 414/143 |
| 1,808,862 | 6/1931 | Peterson | 414/143 |
| 2,458,915 | 1/1949 | Palmer | 414/144 X |
| 3,149,733 | 9/1964 | Joyce | 414/143 |
| 3,384,248 | 5/1968 | Leitch et al. | 414/21 |
| 3,414,144 | 12/1968 | Lassing | 414/144 |
| 3,604,573 | 9/1971 | Leitch | 414/143 |
| 3,604,574 | 9/1971 | Leitch | 414/133 X |
| 4,042,129 | 8/1977 | Hampton | 414/313 |
| 4,126,236 | 11/1978 | Schultz | 414/133 |
| 4,170,433 | 10/1979 | Haahjem | 414/144 X |
| 4,242,026 | 12/1980 | Vaughan et al. | 414/145 |

FOREIGN PATENT DOCUMENTS

| | | | |
|---|---|---|---|
| 650609 | 9/1937 | Fed. Rep. of Germany | 414/313 |
| 1456721 | 3/1969 | Fed. Rep. of Germany | 414/133 |

*Primary Examiner*—Leslie J. Paperner

*Attorney, Agent, or Firm*—Hubbell, Cohen, Stiefel & Gross

[57] ABSTRACT

An apparatus for the self-unloading of dry, particulate bulk material from multiple storage chambers comprising a plurality of aligned holds or the like (12, 14, 16, 18), having aligned discharged gates (46) formed in the bases thereof for discharge onto a longitudinal, tunnel conveyor (50). A pair of scraper conveyors (52) pivotally mounted (54) to a vertical frame (56) are movable into and out of each such hold with the aid of hoists (58) and vertical elevating mechanisms (62). A longitudinally movable support (64) is further provided for transferring the assembly lengthwise of and above the respective holds as well as for traversing the support (64) within each hold to facilitate unloading operations in connection with each such hold.

The scraper conveyors may thus be deployed within or removed from the relatively narrow hatchways (22) of the several cargo holds for sequential operation within each. Moreover, upon deployment the scraper conveyors may be substanitally and continuously in contact with the bulk material to be discharged from each hold along the surface angle thereof. In this manner, the scraper conveyors effect the substantially complete discharge of the bulk materials through the unloading gates (46) of each hold, onto the tunnel conveyor (88, 88a) and a slewed boom conveyor (92), to appropriate on-shore storage facilities or the like.

35 Claims, 11 Drawing Figures

SELF-UNLOADING CARGO VESSEL

TECHNICAL FIELD

This invention relates to an improved self-unloading apparatus capable of removing bulk material from a plurality of storage chambers thereof in a cargo vessel, and particularly to such a cargo vessel having multiple holds interconnected by a common tunnel conveyor, such as in the base of the holds, for emptying the holds of the particulate material onto a transverse conveyor for off-loading from the vessel.

The apparatus of the present invention may advantageously be utilized in the handling of dry, particulate bulk materials such as ores, coal, grain or the like. Moreover, although the apparatus of the present invention is described in terms of a self-unloading cargo ship or barge, it may be employed in conjunction with the self-unloading or reclaiming of material from any multiple storage chamber arrangement in which the multiple storage chambers are interconnected by a common tunnel type of conveyor for emptying of the storage chambers.

BACKGROUND ART

Numerous types of prior art systems have been developed for facilitating the unloading of particulate or bulk material from ships, such as the system developed by Stephens-Adamson for self-unloading lake-type cargo ships, that is ships in which a continuous hold runs substantially the entire length of the ship with a tunnel type conveyor being provided beneath the hold and running substantially its entire length where it joins with a triangular boom conveyor for off-loading of the bulk material from the ship. In such a prior art device, a plurality of unloading gates are located in the base of the hold above the tunnel conveyor and in flow through communication therewith. In the prior art Stephens-Adamson system for use with continuous hold ships, a self-unloading reclaimer having a mechanical harrow with pivotally mounted rakes is employed to assist in discharging the bulk material through the unloading gates onto the tunnel conveyor. However, this self-unloading reclaimer is not useable with a multiple hold or compartment ship, with the self-unloading reclaimer being permanently installed in the single continuous hold of the ship. Another type of prior art device for facilitating in the unloading of bulk material but which is also not removable from the hold is disclosed in U.S. Pat. No. 4,170,433, which discloses a vertical conveyor which operates in conjunction with a transverse raking device which moves the bulk material towards the vertical conveyor for facilitating displacement of the material from the hold. Examples of other prior art devices for use with a single hold of a ship for facilitating the self-unloading of bulk material are disclosed in U.S. Pat. Nos. 1,808,862 and 3,414,144. The arrangement disclosed in U.S. Pat. No. 1,808,862 employs transverse conveyors to deliver the bulk material to a central hopper for off-loading of the material from the ship. Similarly, U.S. Pat. No. 3,414,144 discloses an arrangement in which reciprocating plows are employed to disturb the natural angle of repose of bulk material to facilitate its delivery to a tunnel conveyor located in the base of the hold. However, none of the above prior art arrangements disclose a system which may be readily employed in a multiple hold vessel. Prior art attempts at providing such devices for use in multiple storage compartment arrangements are disclosed in U.S. Pat. Nos. 2,458,915; 3,604,573; 3,149,733 and 775,081. To applicant's knowledge, none of these prior art arrangements have been sufficient because of various deficiencies therein. Thus, the arrangement disclosed in U.S. Pat. No. 2,458,915 is an arrangement in which retractable scrapers may be lowered into a hold for facilitating the emptying of the hold by a central conveyor type device. However, this arrangement may not be employed where the hold has been emptied so as to cause the particulate material to be initially disposed at its natural angle of repose and can only be efficiently employed in a hold that is substantially empty. Similarly, U.S. Pat. No. 3,604,573 discloses an arrangement which merely facilitates in disturbing the natural angle of repose by oscillatory movement of a grab bucket. This arrangement is time consuming and there can be a considerable decrease in the rate at which the bulk material is unloaded as compared with the initial rate when the tunnel conveyor is primarily responsible for the unloading of the material. The devices disclosed in U.S. Pat. Nos. 3,149,733 and 775,081 essentially employ buckets to empty the hold onto a central type of conveyor, which arrangement is again time consuming and does not lend itself towards efficiency in use of a tunnel conveyor system. These disadvantages of the prior art are overcome by the present invention.

DISCLOSURE OF THE INVENTION

An improved self-unloading apparatus for removing bulk material from a plurality of storage chambers connected by a tunnel type conveyor at the base thereof, such as the multiple cargo holds of a ship, is provided in which a pivotally supported scraper conveyor arrangement removably receivable in any of the storage compartments is removably disposable along the surface angle of the stored bulk material for conveying the material to the tunnel type conveyor through unloading gates in the base of the cargo holds. The scraper conveyor arrangement, such as a pair of pivotally supported scraper conveyors, are pivotally supported on a frame which is removably receivable within any of the plurality of storage chambers and their proximal ends by pivot means mounted adjacent the base of the removable frame. The frame includes an arrangement for retracting and extending the scraper conveyors, such as a pulley arrangement which enables maximum advantage to be taken of gravity by utilizing the weight of the scraper conveyors to lean along the surface angle of the bulk material so as to empty the storage compartment by pivoting outwardly due to gravity as the hold or storage compartment empties. This enables the scrapers to be substantially continually disposable along the surface angle during such emptying substantially due to the gravitational forces acting on the extending scrapers as their distal end points pivot outwardly from the retracted position. Hydraulically actuated cylinders may be provided to supplement the gravitational forces acting on the scrapers in applying required pressure to the surface of the material being reclaimed. The scrapers are retracted to enable removal and insertion through the hatch openings in the various storage chambers, with the frame itself preferably being raised and lowered into a given storage chamber by a conventional elevator type of mechanism and translated to the desired storage chamber along rails by a conventional motor drive. Once the scrapers are disposed in a given storage chamber, they are traversed back and forth within the chamber with progressive extension of the scrapers until full reclaiming of the material in that storage chamber has taken place. If desired, the scraper conveyors may have additional rakes or harrows at the distal ends thereof to further facilitate the emptying of the bulk material from the storage chamber. The angular relationship of these rakes or harrows to the angle of the assembled scraper conveyors may be adjusted, such as by manually actuated hydraulic cylinders mounted between the rake or harrow and scraper conveyor frames.

BEST MODE FOR CARRYING OUT THE INVENTION

Figures 1, 5, 6:
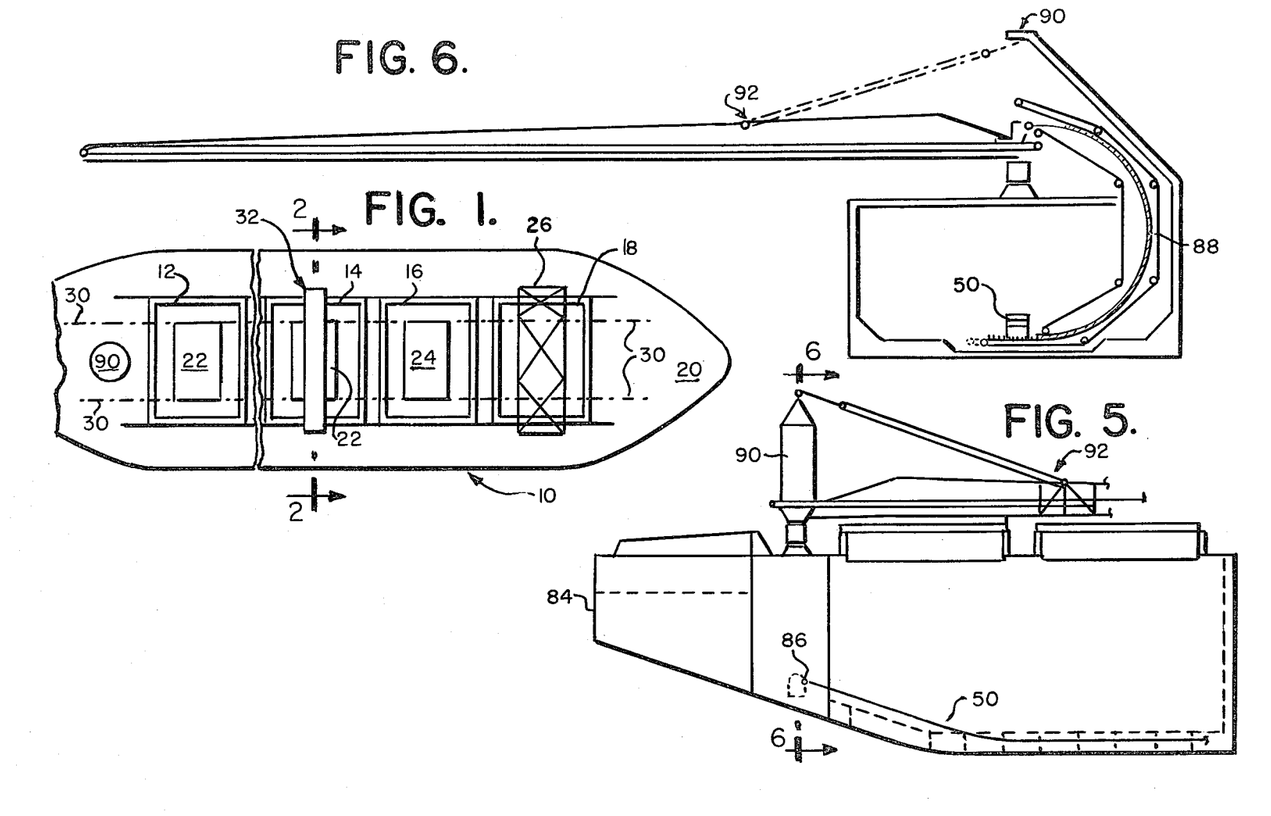
FIG. 1 is a schematic plan view of a portion of the deck of a mutiple hold self-unloading barge in accordance with the present invention.
FIG. 5 is diagrammatic side elevation, partially in section, of the aft end of the barge of FIG. 1, illustrating the discharge end of the tunnel conveyor employed therein.
FIG. 6 is a vertical section taken along line 6—6 of FIG. 5 showing the transverse belt conveyor employed in the barge of FIG. 1 for delivering bulk material to a slewing boom conveyor or other ship-to-shore delivery system for off-loading of the stored bulk material.
Figure 2:
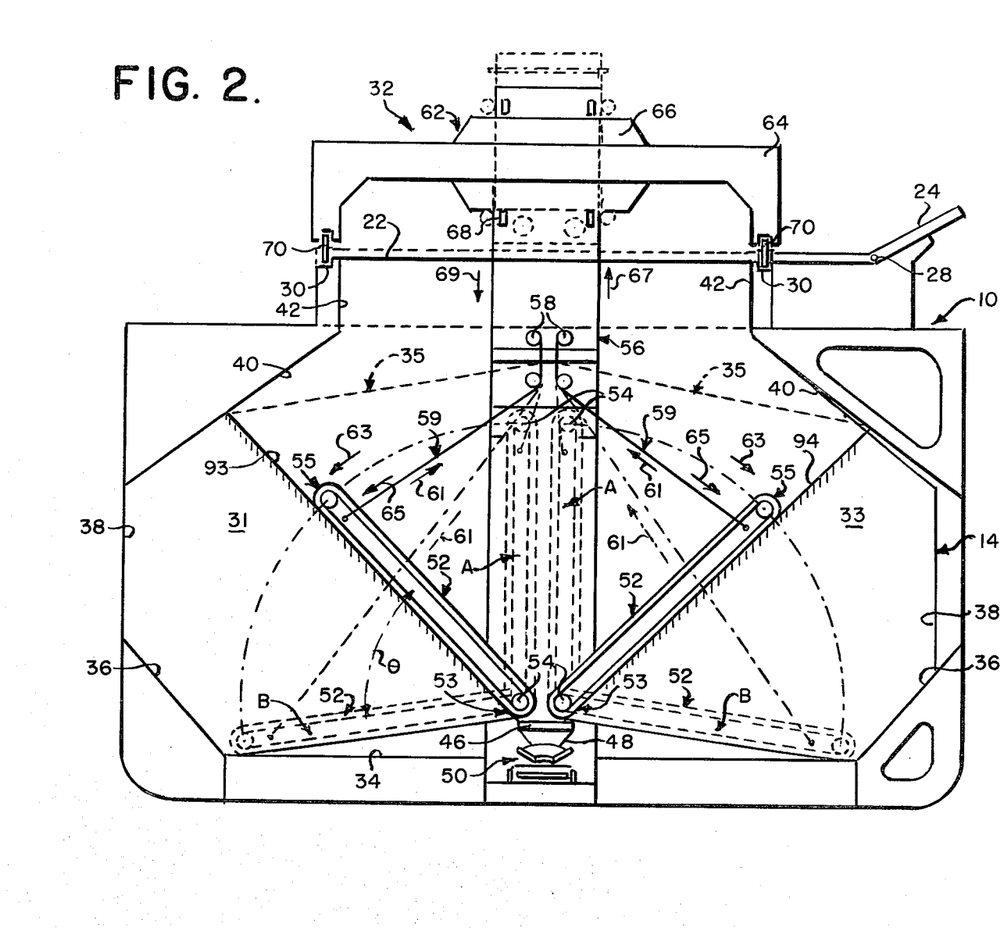
FIG. 2 is a vertical cross-section through one of the holds of the barge of FIG. 1, taken along line 2—2, schematically illustrating a preferred embodiment of the self-unloading apparatus of the present invention.

Referring now to the drawings in detail and initially to FIGS. 1 and 2 thereof, a self-unloading barge 10 in accordance with the present invention is shown. Such a self-unloading barge 10 preferably includes a plurality of separate storage compartments or cargo receiving holds, with four such holds 12, 14, 16 and 18 being shown by way of example. The interior of these holds is preferably configured in the manner illustrated in FIGS. 2 and 3, by way of example, although any type of conventional interior configuration may be employed if desired. Preferably, the multiple holds are aligned along the longitudinal axis of the ship 10 as illustrated in FIG. 1 to facilitate transverse movement and access of a scraper conveyor assembly 32, to be described in greater detail hereinafter with reference to FIGS. 2-6. Preferably, each of the holds 12, 14, 16 and 18 includes a conventional hatch opening 22 which is removably covered by a conventional hatch cover 24, such as one which is hingedly mounted to the deck 20 of the barge 10. Of course, the hatch covers 24 may be removed in any conventional manner, such as by the use of a hatch cover crane diagrammatically illustrated by reference numeral 26 in FIG. 1 or by any other conventional means for hinging the hatch covers 24 open, with such a hinged hatch cover being illustrated by reference numerals 24 and 28 in FIG. 2. For example, if desired, the hatch covers can be lifted by a conventional hoist mechanism associated with the scraper conveyor assembly 32 and stowed over other hatch covers by traversing of the scraper conveyor assembly 32 accordingly.

As shown and preferred in FIGS. 1 and 2, a pair of spaced apart rails 30 extend lengthwise of the ship 10 alongside the hatch openings 22 so as to enable transverse movement of the aforementioned scraper conveyor assembly 32 from one end of the barge 10 to the other so as to facilitate access of the scraper conveyor assembly 32 to any one of the holds 12, 14, 16 or 18. Thus, as will be described in greater detail hereinafter, a single scraper conveyor assembly 32 may be employed to facilitate in the self-unloading of each of the separate compartments or holds 12, 14, 16 and 18.

Figure 8:
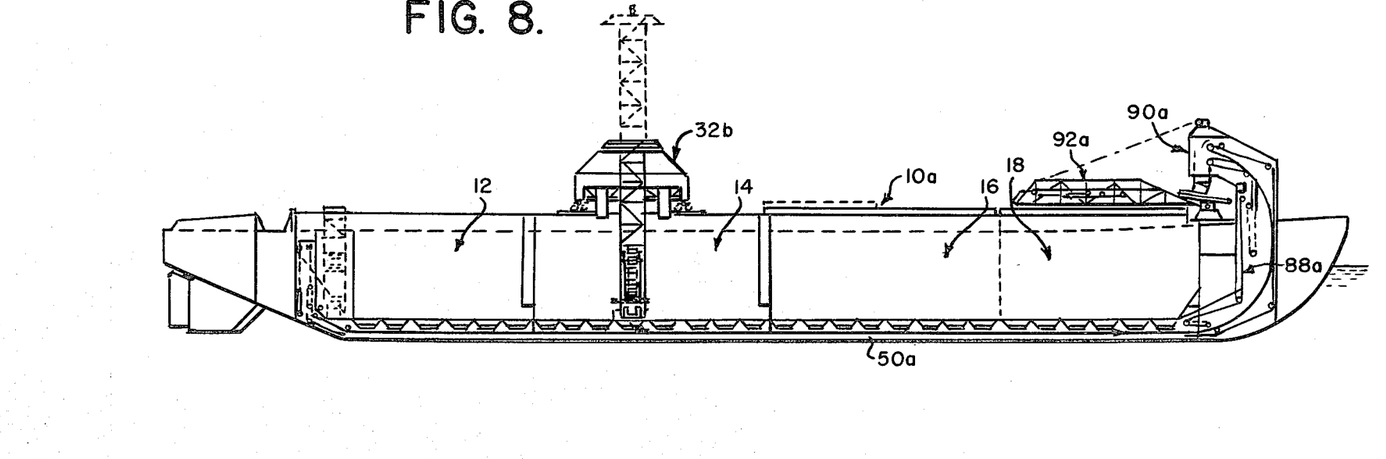
FIG. 8 is a longitudinal sectional view of the vessel arrangement of FIG. 7 illustrating an alternative loop belt arrangement in accordance with the material reclaiming system of the present invention.

Referring now to FIG. 2, the scraper conveyor assembly 32 of the present invention is illustrated as being lowered into one of the holds, 14 by way of example, and deployed so as to facilitate the self-unloading of the bulk material from hold 14, which bulk material has formed two piles 31 and 33, each disposed at the surface angle of the bulk material. This surface angle is initially the natural angle of repose which is conventionally achieved by means of the unloading or emptying of the cargo hold 14 through a typical conventional unloading gate 46 onto a conventional tunnel conveyor 50 which is in flow through communication therewith and is common to all of the cargo holds 12, 14, 16 and 18 so as to conventionally convey the material through the length of the barge 10 to a longitudinal belt conveyor, such as illustrated in FIGS. 5 and 6, or to a loop belt 88a which forms an integral extension of the tunnel conveyor 50a, such as illustrated in FIG. 8. Although only one such unloading gate 46 is illustrated, each hold 12, 14, 16, 18 may contain several such gates. Thus, as will be described in greater detail hereinafter, if the hold 14 is conventionally filled by bulk material to capacity, such as represented by the dotted lines given reference numeral 35, the hold 14 may then be partially emptied solely by use of the tunnel conveyor arrangement 50, with the scraper conveyor assembly 32 removed from the hold, until the bulk material forms the aforementioned two piles 31 and 33 at the natural angle of repose of the bulk material. It is then that the scraper conveyor assembly 32 of the present invention is lowered into the hold 14 so as to assist in completing the discharge of the stored bulk material from the hold 14.

As shown and preferred in FIG. 2, the hold 14 is preferably defined by a floor or base 34, a pair of opposite sloping lower side walls 36, a pair of opposite vertical intermediate side walls 38, a pair of opposite sloping upper side walls 40, a pair of opposite, vertical upper side walls 42 which defines the sides of hatch 22, and a front and rear wall (not shown) which serve to seal cargo hold 14 from the adjacent holds 12 and 16, except of course for the common tunnel conveyor 50 which runs beneath all of the holds 12, 14, 16 and 18 and is selectively accessed by each of the unloading gates 46 centrally disposed in the base 34 of each of the cargo holds 12, 14, 16 and 18. Such an unloading gate 46 is shown in the open position in FIG. 2, represented by doors 48.

As further shown and preferred in FIG. 2, the scraper conveyor assembly 32 preferably includes a pair of conventional scraper conveyors 52, such as the conventional reclaiming scrapers commercially available from Pohlig-Heckel-Bleichert of Germany. These scraper conveyors 52 each have a proximal end 53 and a distal end 55, with the respective proximal ends 53 being pivotally mounted to a frame member 56 at the base of the frame member 56. The distal ends 55 of the scraper conveyor pair 52 are preferably connected via a conventional hoist or cable and pulley arrangement 58, 59 for retracting and extending the scraper conveyor pair 52 from the frame member 56 so as to enable removal and insertion of the scraper conveyor assembly 32 out of and into the respective cargo holds 12, 14, 16 and 18 as well as to facilitate the translation of the scraper conveyor assembly 32 along rails 30 between the respective holds 12, 14, 16 and 18. The hoist mechanism 58, 59 is a conventional hoist mechanism employing a conventional bidirectional hoist arrangement so that the scraper conveyor pair 52 may be pivoted inwardly as a result of a conventional hoist motor winding cables 59 in the direction of arrows 61 while enabling the scraper conveyor pair 52 to be extended outwardly in the direction of arrow 63 while permitting the cables 59 to payout in the direction of arrow 65. In this regard, it should be noted that the weight of the conventional scraper conveyor 52, such as the aforementioned reclaiming scrapers available from Pohlig-Heckel-Bleichert, is sufficient to enable maximum advantage to be taken of gravity to utilize the weight of the scraper conveyors 52 to lean along the surface angle of the piles 31 and 33 of bulk material which were formed as a result of the initial emptying of the hold 14 by the tunnel conveyor 50 and suitably penetrate the surface of the material being reclaimed. If the weight of the scraper conveyors 52 is insufficient additional pressure can be applied through the use of hydraulically actuated cylinders (not shown) mounted between the support column and the frames of the scraper conveyors. By way of illustration, the respective faces of these piles 31 and 33 along which the respective scraper conveyors 52 rest are represented by reference numerals 93 and 94 in FIG. 2. Because of the associated weight of the scrapers 52, the scrapers 52 will continue to lean along the surface angle of the piles 31 and 33 as this angle varies or changes during the continued emptying of the hold due to the action of the reclaiming scrapers 52 in conjunction with the tunnel conveyor 50 until the scraper conveyors 52 are disposed in the fully extended position represented in dotted lines and indicated by the legend B. It should be noted that during such emptying of the hold A by the scrapers 52, the scraper assembly 32 is preferably traversed back and forth within the hold 14 along rails 30 while the scrapers 52 are progressively lowered and pivoted outwardly between reversals to provide for full recovery or reclaiming of the material remaining in the hold 14 after initial draw down by means of gravity has been completed by tunnel conveyor 50. At this point, if it is now desired to remove the scraper conveyor assembly 32 from cargo hold 14, the mechanism is again engaged and the hoist motor winds cables 59 in the direction of arrow 61 until the scraper conveyors 52 have been retracted to the position illustrated in dotted lines in FIG. 2 and represented by the legend A. At this point, a conventional elevator mechanism lifts frame member 56 upwardly in the direction of arrow 67 until the base of the frame member completely clears the hatch opening 22. At this point, the scraper conveyor assembly 32 can then be translated along rails 30 and deployed in a different cargo hold in the same manner as described above with respect to cargo hold 14 by once again lowering the frame member 56 in the direction of arrow 69 preferably until the base thereof is located above the unloading gate or gates 46 by a sufficient distance to permit the scraper conveyor pair 52 to pivot outwardly to have its entire length lean along the surface angle of the respective piles 31 and 33 of bulk material formed in the hold with the aforementioned traversal of the scraper assembly within the hold again preferably being employed during the reclaiming operation. Preferably, the scraper conveyor assembly 32 of the present invention is employed to reclaim material from one hold which has previously been emptied or drawn down as much as possible by gravity the common tunnel conveyor 50 to initially form the aforementioned natural angle of repose of the bulk material, while such material is simultaneously being drawn down by gravity from an adjacent hold. Thus, the preferred concept of unloading involves simultaneous withdrawal of material by gravity and by means of the reclaiming scraper assembly 32, except for the inital draw down by gravity of the first hold and final reclaiming by assembly 32 of material remaining in the last hold to be unloaded.

Referring now to FIGS. 5 and 6, these figures illustrate a conventional type of loop belt arrangement for the self-unloading barge 10 of the present invention for off-loading the bulk material from the tunnel conveyor 50. Thus, referring initially to FIG. 5, the aft end 84 of the barge 10 preferably includes a delivery end 86 of the tunnel conveyor 50 which is conventionally arranged in flow through communication with a transverse vertical delivery or loop belt conveyor 88 disposed, for example, on the starboard side of the barge 10 for off-loading of the bulk material from the tunnel conveyor 50. As shown and preferred in FIG. 5, the delivery end of transverse conveyor 88 is disposed within a conventional on-deck transfer chute 90 which further defines the feed end for a conventional slewing boom conveyor 92 schematically illustrated in FIGS. 5 and 6. Boom conveyor 92 conventionally off-loads the bulk material delivered from the tunnel conveyor 50 onto the transverse conveyor 88 to a conventional on-shore installation. Of course, the direction of unloading can be selected to be either toward the stern or bow without departing from the present invention. Moreover, if desired the loop conveyor 88 can be an integral part of the hold conveyor, such as illustrated by loop conveyor 88a in FIG. 8.

Figure 3:
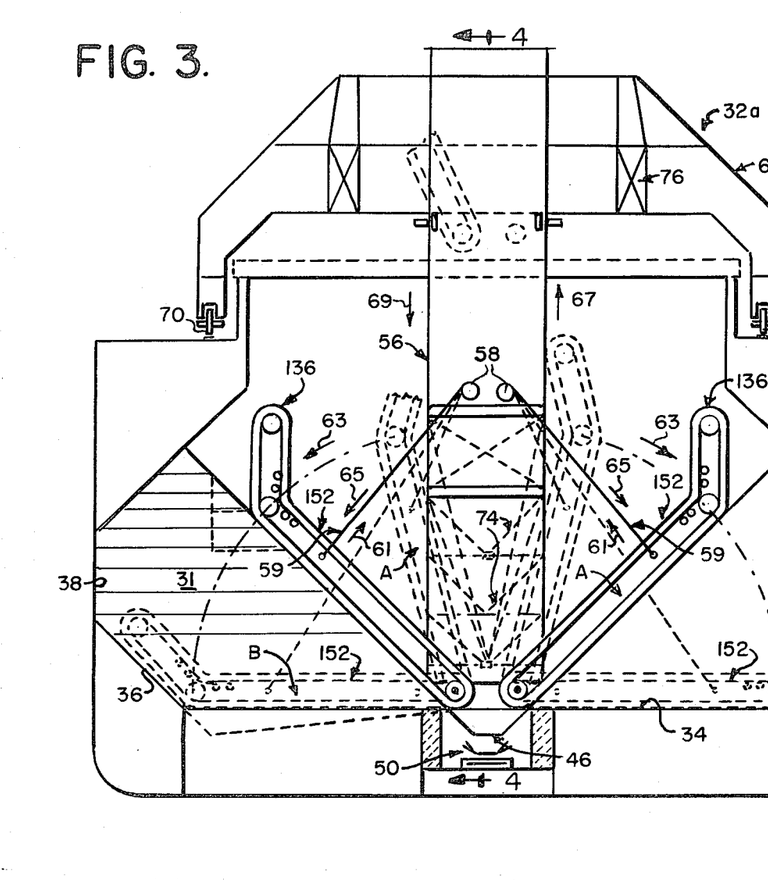
FIG. 3 is a vertical cross-sectional view similar to FIG. 2 of an alternative embodiment of the self-unloading apparatus of the present invention.
Figure 4:
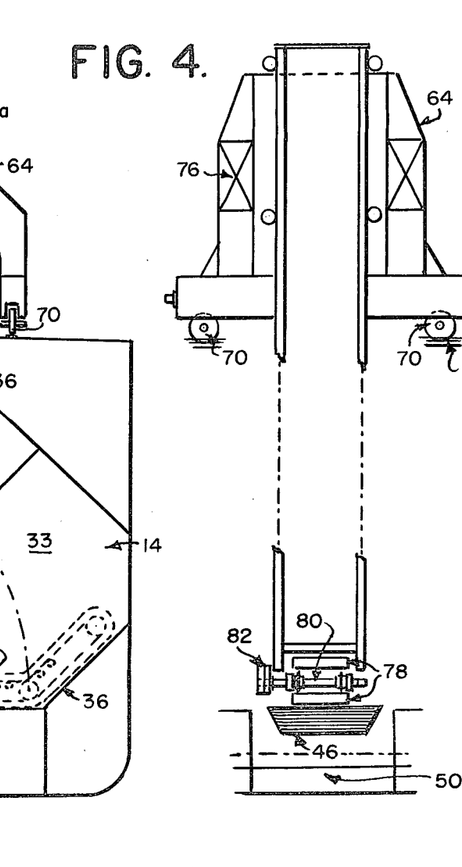
FIG. 4 is a fragmentary side elevational view of the embodiment of FIG. 3 taken along line 4—4.
Figure 11:
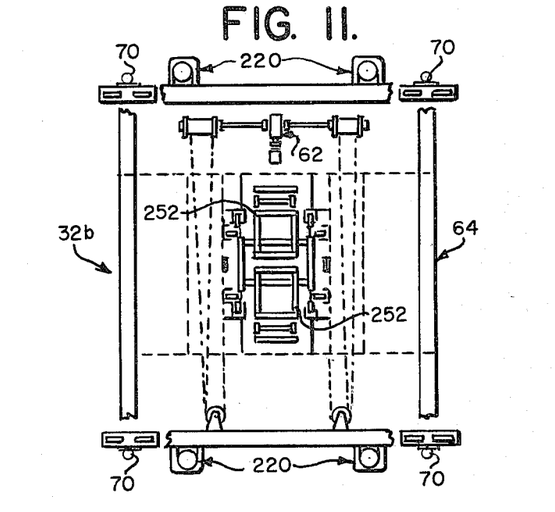
FIG. 11 is a fragmentary plan view of the carriage portion of the embodiment of FIGS. 9 and 10.

Referring now to FIGS. 3 and 4, an alternative embodiment of the scraper conveyor assembly 32 of the present invention is shown, with such alternative embodiment generally being referred to by the reference numeral 32a. As shown and preferred in FIG. 3, the alternative embodiment 32a is preferably identical with the scraper conveyor assembly 32 described with reference to FIG. 2 with the exception of the scraper conveyors employed. Thus, in place of scraper conveyors 52, a conventional scraper conveyor 152 is employed, such as one either having a conventional rake extending from the distal end thereof preferably at an angle of 45° to the main scraper conveyor or one in which this extension is integrally formed as part of a continuous belt scraper conveyor. In either event, the primary purpose of extension portion 136 is to facilitate removal of bulk material from the corners of the cargo compartment, such as compartment 14, as the scraper conveyor 152 approaches the fully extended position shown in dotted lines and represented by the legend B. The 45° angle has preferably been selected, by way of example, so as to insure that the scraper conveyor 152 is complementary to the interior walls of the cargo hold 14 while enabling the scrapers 152 to clear the supports and interior walls of the respective cargo holds as the scraper conveyors 152 pivot outwardly in the direction of arrow 63 to the fully extended position and inwardly in the opposite direction to the retracted position represented in dotted lines in FIG. 3 and indicated by the legend A. Apart from the difference, the scraper conveyor assembly 32a is preferably identical in function and operation with previously described scraper conveyor assembly 32. Thus, a conventional hoist mechanism retracts the pivotally mounted scraper conveyor pair 152 by winding cables 59 in the direction of arrow 61 while enabling cables 59 to payout in the direction of arrow 65 when it is desired to extend the scraper conveyors 152. Again maximum advantage is taken of gravity to utilize the associated weight of the scrapers 152 to lean along the surface angle formed by piles 31 and 33 of bulk material in the manner previously described. As previously mentioned with respect to assembly 32, if the weight of the scraper assembly 32a is insufficient, additional pressure can be supplied by hydraulically actuated cylinders (not shown) mounted between the scrapers 152 and the frame. Such hydraulically actuated cylinders 200 are illustrated by way of example in the embodiment of FIG. 9, which illustrates an arrangement in which harrows 202 are attached as extensions to the scraper conveyors 252. As shown and preferred in FIG. 3, the extension portions 136 do not lean along the surface angle but are primarily employed to convey bulk material from the corners 36 of the hold 14. Because of the angular relationship between the extension portion 136 and the balance of the scraper conveyor 152, when the scraper conveyor is in the retracted position illustrated in dotted lines by legend A in FIG. 3, the scraper conveyor pair 152 is not flush within frame member 56, such as is possible with the linear arrangement of the embodiment of FIG. 2. However, scraper conveyors 152 are sufficiently retracted so as to clear the hatch opening 22 when the frame member 56 is raised out of the hatch opening 22 in the direction of arrow 67 or lowered into position within the hold through hatch opening 22 in the direction of arrow 69. With respect to the aforementioned conventional elevating mechanism 62, for conventionally raising and lowering frame member 56, frame member 56 is conventionally raised and lowered on a supporting carriage 64 by which the scraper conveyor assembly 32 or 32a is translated on rails 30. By way of example, a conventional motor 66 for raising and lowering frame member 56 as well as for translating carriage 64 is shown. Of course, as diagrammatically illustrated in FIGS. 2 and 3, appropriate conventional guide and drive rollers 58 or equivalent guide device is employed for facilitating the raising and lowering of frame member 56 on the carriage 64. As shown and preferred in FIG. 4, the carriage 64 preferably rides along rollers 70 on rails 30 as it is driven between the various holds 12, 14, 16 and 18 and as it is traversed within the hold during the reclaiming operation by a conventional rack and pinion traverse drive 220 (FIG. 11). As further illustrated in FIG. 4, by way of example, the scraper conveyor 152 may include a plurality of blades 78 conventionally mounted on a chain drive about an axle 80 which is driven by a conventional scraper drive 82. Moreover, if desired, the conventional boom hoist mechanism 58, 59 may be reinforced to compensate for any additional weight associated with the scraper conveyor 152 as opposed to the type of scraper conveyor 52 employed with respect to the embodiment of FIG. 2.

Figure 7:
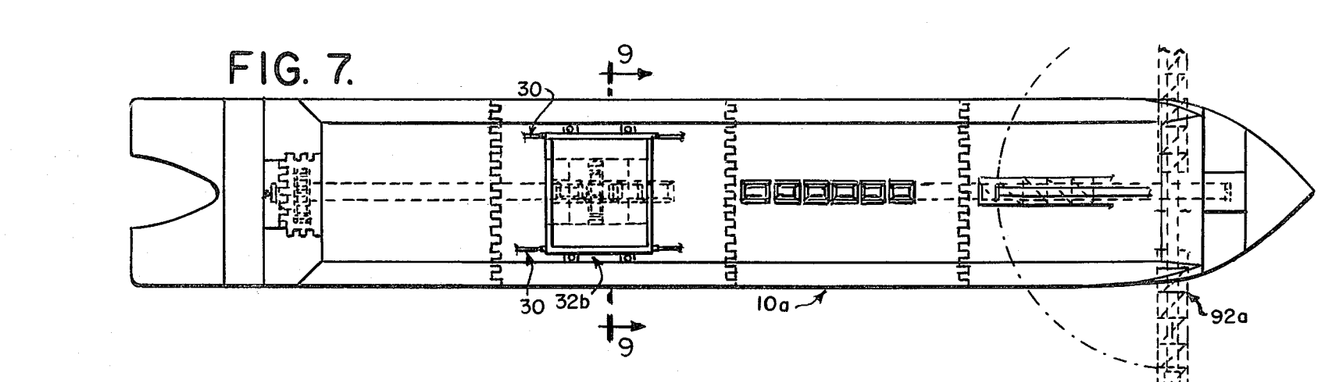
FIG. 7 is a schematic plan view similar to FIG. 1 of an alternative embodiment of the deck portion of a multiple hold self-unloading vessel in accordance with the present invention.

Referring now to FIGS. 7-11, and initially to FIGS. 7 and 8, an alternative embodiment of the self-unloading vessel 10a of the present invention is shown. FIGS. 7 and 8 illustrate an alternative arrangement for off-loading material from the vessel 10a through the use of a loop belt conveyor 88a which is formed as an integral extension of the tunnel or hold conveyor 50a. Apart from this distinction, the operation of the loop belt arrangement of the embodiment of FIGS. 7 and 8 is preferably essentially identical in function with that of the embodiments of FIGS. 5 and 6 in that the delivery end of loop belt conveyor 88a is disposed within the conventional on-deck transfer chute 90a which defines the feed end for the conventional slewing boom conveyor 92a which conventionally off-loads the bulk material delivered from the tunnel conveyor-loop belt conveyor arrangement 50a–88a to a conventional onshore installation.

Figure 9:
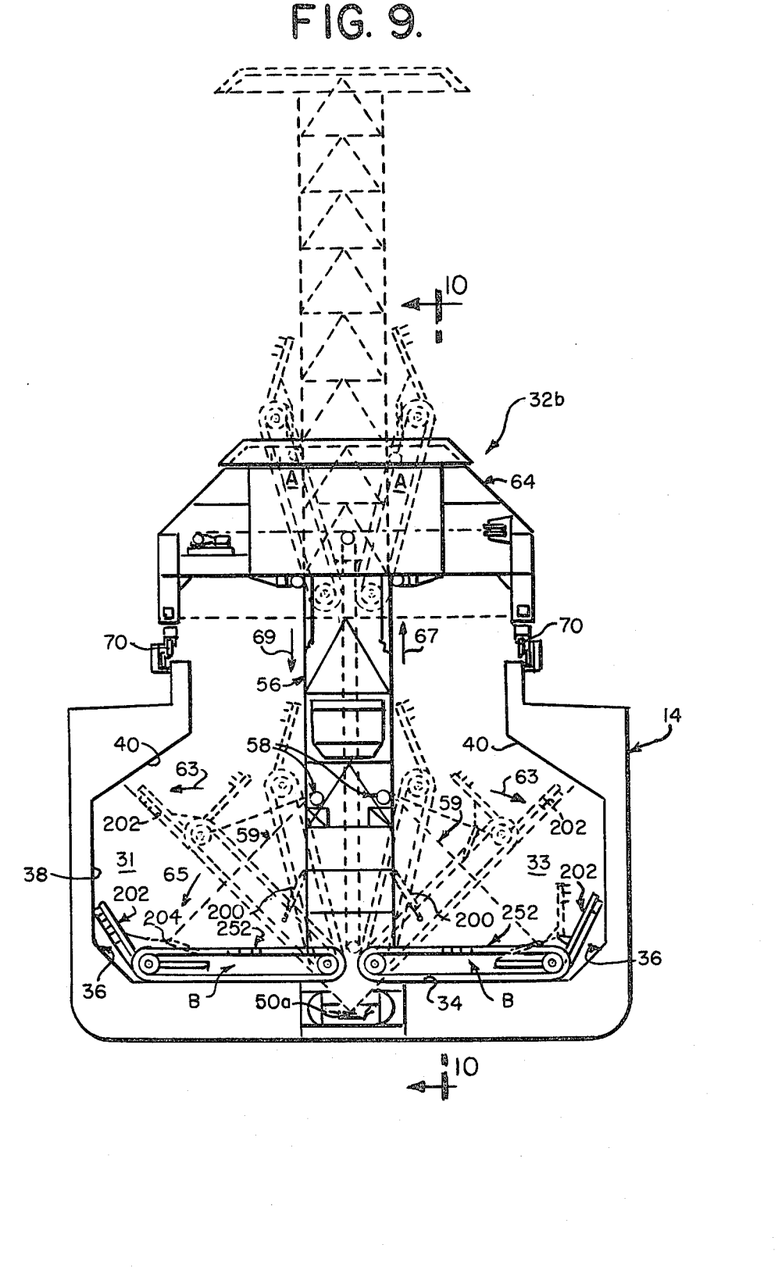
FIG. 9 is a vertical cross-sectional view through one of the holds of the vessel of FIG. 7, taken along line 9—9, similar to FIGS. 2 and 3, schematically illustrating a preferred alternative embodiment of the self-unloading apparatus of the present invention.
Figure 10:
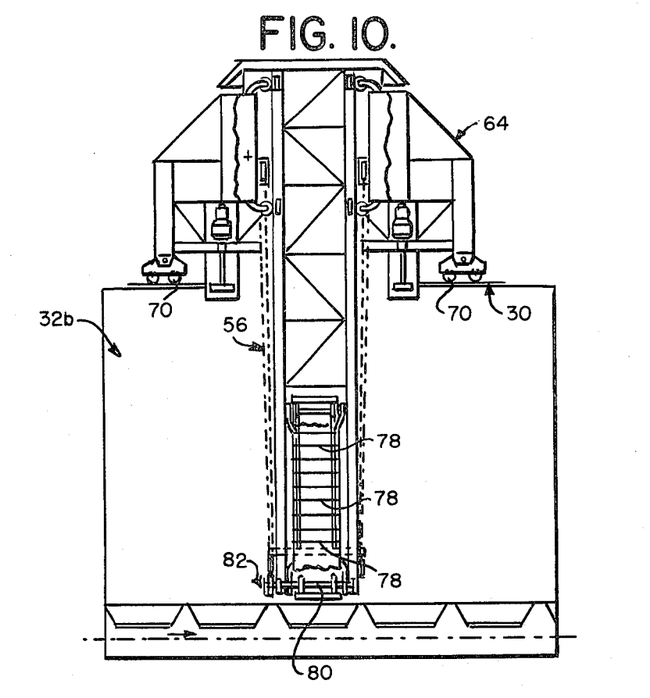
FIG. 10 is a fragmentary side elevational view of the embodiment of FIG. 9 taken along line 10—10.

Referring now to FIGS. 9-11, another alternative embodiment of the scraper conveyor assembly 32 and of scraper conveyor assembly 32a of the present invention is shown, with such alternative embodiment generally being referred to by the reference numeral 32b. As shown and preferred in FIG. 9, the embodiment 32b is preferably identical with the scraper conveyor assembly 32a described with reference to FIGS. 3 and 4, with the exception of the scraper conveyor arrangement employed. Thus, in place of scraper conveyor 152 of FIG. 3 or 52 of FIG. 2, a conventional scraper conveyor 252 having a conventional rake or harrow 202 extending from the distal end thereof is employed. The harrow 202 is preferably pivotally attached to the distal end of scraper conveyor 252 and is further connected to the scraper conveyor 252 by means of a hydraulically actuated cylinder 204 which enables the angle that the harrow 202 makes with the scraper conveyor 252 to be controllably varied unlike the embodiment of FIG. 3 in which the angle is fixed. Thus, as shown in FIG. 9, depending on the interior configuration of the hold, the harrow 202 can be extended to be in line with the scraper conveyor 252 and lean along the surface angle as the scraper conveyor 252 is being extended from its retracted position so as to bring material down to within the reach of the scraper conveyor 252 or to be substantially complementary to the interior walls of the cargo hold as the scraper conveyor 252 approaches its fully extended position in the hold so as to convey material from the corners of the hold. In addition to hydraulically actuated cylinders 204, as was previously mentioned, the scraper conveyor assembly 32b preferably includes hydraulically actuated cylinders 200 mounted between the scraper 252 and the frame so as to apply additional pressure as the scraper 252 leans along the surface angle formed by piles 31 and 33 of the bulk material. Apart from the operation of hydraulically actuated cylinders 200 and 204 which can be further employed to assist in retracting the scraper conveyor 252 and harrows 202, the function and operation of the mechanism for raising and lowering the frame member 56, for translating the carriage 64 and for extending and retracting the scraper conveyors 252 is preferably identical with that previously described with reference to FIGS. 1–4, with identical reference numerals being employed for such elements.

Summarizing the operation of the self-unloading apparatus of the present invention, a typical cargo hold of the ship or barge is first preferably emptied or drawn down by gravity by means of the conventional tunnel conveyor located beneath the base of the hold until such time as the bulk material forms its surface angle which is its natural angle of repose in the hold. At that time, the scraper conveyor assembly of the present invention is driven to the desired hold along the rails and the retracted pivotally mounted scraper pair is then lowered into the hold and extended until the scraper conveyor pairs initially lean along the natural angle of repose of the particulate material. Thereafter, the scraper assembly is traversed within the hold while the scraper pair is progressively lowered between reversals and, as the bulk material is directed toward the tunnel conveyor during the emptying of the hold and the surface angle changes, the scraper conveyor pair continues to pivot outwardly and lean along the changing surface angle of the material due to the gravitational forces acting on the scraper conveyor pair until such time as the scraper conveyor pair is in the fully extended position along the base of the hold with the hold essentially emptied. Thereafter, the scraper pair is retracted by means of the hoist mechanism and the frame support therefor is then elevated or lifted out of the hold through the hatch opening. The entire assembly is then translated to the next hold and the operation repeated. While the scraper conveyor assembly is disposed within one hold and reclaiming material from that hold which has been previously drawn down by gravity, material is simultaneously being drawn down by gravity from an adjacent hold or other hold, except for the initial draw down by gravity of the first hold and the final reclaiming of material remaining in the last hold to be unloaded. Thus, in accordance with the present invention, maximum advantage may be taken of gravity to utilize the weight of the scraper elements to lean along the surface angle of the bulk material and empty the hold with the scraper elements pivoting outwardly as the hold empties so as to be substantially continually disposed along the surface angle of the material during the emptying of the hold.

What is claimed is:

1. In a self-unloading apparatus capable of removing bulk material from a plurality of storage chambers therefor in a vessel on which each of said storage chambers has a hatch opening at the top thereof and includes at least one unloading gate extending through the base thereof for regulating the flow of said bulk material through the base of said storage chamber, and a common longitudinal conveyor means disposed beneath the unloading gates of said chambers and in flow through communication therewith for enabling removal of said bulk material discharged through each of said unloading gates, said bulk material storable in each of said chambers being capable of forming a surface angle with respect to the discharge of said bulk material through said unloading gates; the improvement comprising frame means removably receivable within any of said plurality of storage chambers; and a scraper conveyor means pivotally supported on said frame means and removably disposable along said surface angle for conveying said formed stored bulk material to said one unloading gate for discharge therethrough onto said longitudinal conveyor means, said scraper conveyor means having a proximal end and a distal end and being pivotally supported on said frame means at said proximal end by pivot means mounted adjacent the base of said removable frame means, said frame means further comprising means for retracting and extending said scraper conveyor means distal end between a retracted position for enabling removal and insertion of said supported scraper conveyor means through said storage chamber hatch opening and an extended position, said retracting and extending means including means for enabling said scraper conveyor means to be substantially continually disposable along said surface angle as said surface angle varies during said emptying of said stored bulk material from said storage chamber through said one unloading gate, means for raising and lowering said frame means into said storage chamber through said hatch opening, with said scraper conveyor means in said retracted position, between a raised position in which said supported scraper conveyor means is removed from said storage chamber and an inserted position in which said lowered frame enables said supported scraper conveyor means to be extended along said surface angle, and means for translating said raised frame means between said plurality of storage chambers for selectively enabling said removal and insertion of said frame supported scraper conveyor means into said inserted position in any of said storage chambers, whereby complete discharge of said stored bulk material from each of said storage chambers may be facilitated.

2. A self-unloading apparatus in accordance with claim 1 wherein said retracting and extending means comprises means for enabling said scraper conveyor means to be substantially continually disposable along said surface angle substantially due to gravitational forces acting on said extending scraper conveyor means as said distal end pivots outwardly from said retracted position as said surface angle varies during said emptying of said stored bulk material from said storage chamber through said one unloading gate.

3. A self-unloading apparatus in accordance with claim 2 wherein the pivotally mounted proximal end of said scraper conveyor means is removably disposable in said storage chamber above said one unloading gate by said frame means after insertion thereof in said storage chamber, whereby said extending scraper conveyor means directs said bulk material along said surface angle toward said one unloading gate.

4. A self-unloading apparatus in accordance with claim 1 wherein the pivotally mounted proximal end of said scraper conveyor means is removably disposable in said storage chamber above said one unloading gate by said frame means after insertion thereof in said storage chamber, whereby said scraper conveyor means directs said bulk material along said surface angle toward said one unloading gate.

5. A self-unloading apparatus in accordance with claim 2 further comprising means for raising and lowering said frame means into said storage chamber through said hatch opening with said scraper conveyor means in said retracted position between a raised position in which said supported scraper conveyor means is removed from said storage chamber and an inserted position in which said lowered frame enables said supported scraper conveyor means to be extended along said surface angle.

6. A self-unloading apparatus in accordance with claim 5 further comprising means for translating said raised frame means between said plurality of storage chambers for selectively enabling said removal and insertion of said frame supported scraper conveyor means into said inserted position in any of said storage chambers.

7. A self-unloading apparatus in accordance with claim 4 further comprising means for raising and lowering said frame means into said storage chamber through said hatch opening with said scraper conveyor means in said retracted position between a raised position in which said supported scraper conveyor means is removed from said storage chamber and an inserted position in which said lowered frame enables said supported scraper conveyor means to be extended along said surface angle.

8. A self-unloading apparatus in accordance with claim 7 further comprising means for translating said raised frame means between said plurality of storage chambers for selectively enabling said removal and insertion of said frame supported scraper conveyor means into said inserted position in any of said storage chambers.

9. A self-unloading apparatus in accordance with claim 1 further comprising means for translating said raised frame means between said plurality of storage chambers for selectively enabling said removal and insertion of said frame supported scraper conveyor means into said inserted position in any of said storage chambers.

10. A self-unloading apparatus in accordance with claim 1 wherein said scraper conveyor means comprises a pair of pivotally mounted scraper conveyors, said one unloading gate being substantially centrally disposed along the base of said storage chamber with said proximal ends of said pivotally mounted scraper conveyors being adjacent each other and with said distal ends thereof being outwardly extendable away from each other so as to each be disposable along the surface angle of a different formed pile of said stored bulk material and retractable toward each other for enabling said removal and insertion, whereby said different piles are commonly discharged through said one unloading gate.

11. A self-unloading apparatus in accordance with claim 10 wherein the pivotally mounted proximal end of each of said scraper conveyors is removably disposable in said storage chamber above said one unloading gate by said frame means after insertion thereof in said storage chamber, whereby said extending scraper conveyors direct said bulk material along said surface angle toward said one unloading gate.

12. A self-unloading apparatus in accordance with claim 11 wherein said retracting and extending means comprises means for enabling said scraper conveyors to be substantially continually disposable along said surface angle substantially due to gravitational forces acting on said extending scraper conveyors as said distal end pivots outwardly from said retracted position as said surface angle varies during said emptying of said stored bulk material from said storage chamber through said one unloading gate.

13. A self-unloading apparatus in accordance with claim 10 wherein each of said scraper conveyors further comprises rake means at the distal end thereof.

14. A self-unloading apparatus in accordance with claim 13 wherein said rake means is pivotally connected to the distal end of said scraper conveyor, said apparatus further comprising means connected between said rake means and said scraper conveyor for varying the angle formed between said pivotally connected rake means and said scraper conveyor at said distal end.

15. A self-unloading apparatus in accordance with claim 14 wherein said angle varying means comprises hydraulically actuated cylinder means.

16. A self-unloading apparatus in accordance with claim 10 wherein said retracting and extending means comprises means for enabling said scraper conveyors to be substantially continually disposable along said surface angle substantially due to gravitational forces acting on said extending scraper conveyors as said distal end pivots outwardly from said retracted position as said surface angle varies during said emptying of said stored bulk material from said storage chamber through said one unloading gate.

17. A self-unloading apparatus in accordance with claim 10 wherein said one unloading gate is capable of forming said different piles of said stored bulk material in said storage chamber disposed at said surface angle thereof from discharge of an initially formed common pile of said bulk material through said one unloading gate, whereby said scraper conveyors facilitate completion of the discharge of said initially formed common pile through said unloading gate.

18. A self-unloading apparatus in accordance with claim 17 wherein said retracting and extending means comprises means for enabling said scraper conveyors to be substantially continually disposable along said surface angle substantially due to gravitational forces acting on said extending scraper conveyors as said distal end pivots outwardly from said retracted position as said surface angle varies during said emptying of said stored bulk material from said storage chamber through said one unloading gate.

19. A self-unloading apparatus in accordance with claim 18 wherein the pivotally mounted proximal end of each of said scraper conveyors is removably disposable in said storage chamber above said one unloading gate by said frame mean after insertion thereof in said storage chamber, whereby said extending scraper conveyors direct said bulk material along said surface angle toward said one unloading gate.

20. A self-unloading apparatus in accordance with claim 17 wherein the pivotally mounted proximal end of each of said scraper conveyors is removably disposable in said storage chamber above said one unloading gate by said frame means after insertion thereof in said storage chamber, whereby said extending scraper conveyors direct said bulk material along said surface angle toward said one unloading gate.

21. A self-unloading apparatus in accordance with claim 1 wherein said vessel comprises a ship with said storage chambers comprising aligned holds in said ship.

22. A self-unloading apparatus in accordance with claim 21 further comprising means for translating said raised frame means between said plurality of storage chambers for selectively enabling said removal and insertion of said frame supported scraper conveyor means into said inserted position in any of said storage chambers, said translating means comprising rail mounting means for said frame means disposed about said aligned holds and means for longitudinally translating said frame means between said holds along said rail mounting means.

23. A self-unloading apparatus in accordance with claim 21 further comprising a transverse conveyor means in flow through communication with said longitudinal conveyor means for off loading said discharged bulk material.

24. A self-unloading apparatus in accordance with claim 1 wherein said longitudinal conveyor means comprises a tunnel conveyor.

25. A self-unloading apparatus in accordance with claim 1 wherein said scraper conveyor means further comprises rake means at the distal end thereof.

26. A self-unloading apparatus in accordance with claim 1 further comprising means for removably inserting said base of said frame means adjacent the base of any of said storage chambers for enabling said scraper conveyor means substantially continual disposal along said surface angle.

27. A self-unloading apparatus in accordance with claim 1 further comprising means for translating said inserted scraper conveyor means fore and aft which said storage chamber as said stored bulk material is conveyed to said one unloading gate for facilitating reclaiming of said stored bulk material from said storage chamber.

28. A self-unloading apparatus in accordance with claim 27 wherein said scraper conveyor extending means comprises means for progressively extending said scraper conveyor means distal end between reversals in said translation of said inserted scraper conveyor means.

29. A self-unloading apparatus in accordance with claim 1 further comprising means for translating said inserted scraper conveyor means fore and aft within said storage chamber as said stored bulk material is conveyed to said one unloading gate for facilitating reclaiming of said stored bulk material from said storage chamber.

30. In a self-unloading apparatus capable of removing bulk material from a plurality of storage chambers therefor in a vessel on which each of said storage chambers has a hatch opening at the top thereof and includes at least one unloading gate extending through the base thereof for regulating the flow of said bulk material through the base of said storage chamber, and a common longitudinal conveyor means disposed beneath the unloading gates of said chambers and in flow through communication therewith for enabling removal of said bulk material discharged through each of said unloading gates; the improvement comprising frame means removably receivable within any of said plurality of storage chambers; and a scraper conveyor means having a proximal end and a distal end and being pivotally supported on said frame means at said proximal end by pivot means mounted adjacent the base of said removable frame means for enabling said scraper conveyor means to be substantially in an extended position disposable along a surface angle formed by said bulk material with respect to the discharge of said bulk material through an unloading gate, said frame means including means for retracting and extending said scraper conveyor means distal end between a retracted position for enabling removal and insertion of said supported scraper conveyor means through said storage chamber hatch opening and said extended position as said distal end pivots outwardly from said retracted position as said surface angle varies during said emptying of said stored bulk material through said unloading gate, means for raising and lowering said frame means into said storage chamber through said hatch opening, with said scraper conveyor means in said retracted position, between a raised position in which said supported scraper conveyor means is removed from said storage chamber and an inserted position in which said lowered frame enables said supported scraper conveyor means to be extended along said surface angle, and means for translating said raised frame means between said plurality of storage chambers for selectively enabling said removal and insertion of said frame supported scraper conveyor means into any of said storage chambers, whereby complete discharge of said stored bulk material from each of said storage chambers may be facilitated.

31. A self-unloading apparatus in accordance with claim 30, wherein said scraper conveyor means comprises a pair of pivotally mounted scraper conveyors, said one unloading gate being substantially centrally disposed along the base of said storage chamber with said proximal ends of said pivotally mounted scraper conveyors being adjacent each other and with said distal ends thereof being outwardly extendable away from each other so as to each be disposable along the surface angle of a different formed pile of said stored bulk material and retractable toward each other for enabling said removal and insertion, whereby said different piles are commonly discharged through said one unloading gate.

32. A self-unloading apparatus in accordance with claim 31, wherein the pivotally mounted proximal end of each of said scraper conveyors is removably disposable in said storage chamber above said one unloading gate by said frame means after insertion thereof in said storage chamber, whereby said extending scraper conveyors direct said bulk material along said surface angle toward said one unloading gate.

33. A self-unloading apparatus in accordance with claim 32, wherein said retracting and extending means comprises means for enabling said scraper conveyors to be substantially continually disposable along said surface angle substantially due to gravitational forces acting on said extending scraper conveyors as said distal end pivots outwardly from said retracted position as said surface angle varies during said emptying of said stored bulk material from said storage chamber through said one unloading gate.

34. A self-unloading apparatus in accordance with claim 31, wherein said retracting and extending means comprises means for enabling said scraper conveyors to be substantially continually disposable along said surface angle substantially due to gravitational forces acting on said extending scraper conveyors as said distal end pivots outwardly from said retracted position as said surface angle varies during said emptying of said stored bulk material from said storage chamber through said one unloading gate.

35. A self-unloading apparatus in accordance with claim 31, wherein said one unloading gate is capable of forming said different piles of said stored bulk material in said storage chamber disposed at said surface angle thereof from discharge of an initially formed common pile of said bulk material through said one unloading gate whereby said scraper conveyors facilitate completion the discharge of said initially formed common pile through said unloading gate.

* * * * *